United States Patent [19]

Runkel et al.

[11] Patent Number: 5,046,755

[45] Date of Patent: Sep. 10, 1991

[54] HYDROPNEUMATIC SUSPENSION SYSTEM

[75] Inventors: Walter Runkel; Kurt M. Hummel, both of Wuppertal; Rudolf Schulte, Ennepetal, all of Fed. Rep. of Germany

[73] Assignee: Hermann Hemscheidt Maschinenfabrik GmbH & Co., Wuppertal, Fed. Rep. of Germany

[21] Appl. No.: 496,982

[22] Filed: Mar. 22, 1990

[30] Foreign Application Priority Data

Mar. 29, 1989 [DE] Fed. Rep. of Germany ....... 3910119

[51] Int. Cl.$^5$ ..................... B60G 11/26; B60G 15/12
[52] U.S. Cl. .................... 280/708; 280/714; 137/512.5; 137/512
[58] Field of Search ............... 280/693, 698, 702, 708, 280/709, 710, 711, 712, 714, 715; 188/269; 137/493.8, 493, 512, 512.5, 513

[56] References Cited

U.S. PATENT DOCUMENTS

| | | | |
|---|---|---|---|
| 3,706,362 | 12/1972 | Faure | 137/493.8 |
| 4,145,067 | 3/1979 | Ceriani | 280/714 |
| 4,212,484 | 7/1980 | Fujii | 280/714 |
| 4,273,358 | 6/1981 | Taft | 280/714 |
| 4,377,299 | 3/1983 | Fujii | 280/714 |
| 4,465,299 | 8/1984 | Stone et al. | 280/714 |
| 4,669,710 | 6/1987 | Horvat | 280/714 |
| 4,815,751 | 3/1989 | Tuczek | 280/714 |
| 4,861,068 | 8/1989 | McCabe | 280/714 |

FOREIGN PATENT DOCUMENTS

| | | |
|---|---|---|
| 2240453 | 4/1973 | Fed. Rep. of Germany . |
| 3613677 | 10/1987 | Fed. Rep. of Germany . |
| 3643310 | 6/1988 | Fed. Rep. of Germany . |
| 3724271 | 2/1989 | Fed. Rep. of Germany . |
| 3839446 | 6/1989 | Fed. Rep. of Germany . |

Primary Examiner—Charles A. Marmor
Assistant Examiner—Tamara L. Finlay
Attorney, Agent, or Firm—Goodman & Teitelbaum

[57] ABSTRACT

A hydropneumatic suspension system having at least one shock and vibration damper including a cylinder-piston unit (2) provided with a gas storer (34) co-acting with a damping valve (60) provided with choke valves (88, 90, 92, 94). The choke valves (88, 90, 92, 94) include valve elements (96) biased with springs (98) in a closing direction of the valve elements (96). The bias tension of the springs (98) is variable by a setting member (100) acting on these springs (98) in common in a closing or opening direction of the valve elements (96). A load-dependent adjustment of the damping can be achieved, as the setting member (100) is driven by the pressure present inside the gas storer (34).

24 Claims, 8 Drawing Sheets

HYDROPNEUMATIC SUSPENSION SYSTEM

The present invention relates to a hydropneumatic suspension system having at least one shock and vibration damper including a cylinder-piston unit, a gas storer and a damping valve provided with choke valves arranged in the hydraulic circulation thereof.

Such a suspension system is known, for example, from German unexamined patent specification DE-OS 36 13 677, which discloses a hollow cylindrical piston rod disposed in a cylinder of a hydropneumatic piston-cylinder unit, with a separating piston being guided in the hollow cylindrical piston rod. The separating piston is freely movable inside the piston rod and divides a compensation space for a hydraulic medium from a gas storer filled with a compressible medium. The piston head, at the end of the piston rod, has a passageway through which, in the piston movement, the hydraulic medium can flow from a cylinder chamber into the compensation space or vice versa. The medium flowing into the compensation space brings about a compression of the gas storer caused by the freely movable separating piston, and thus a spring action. In the passageway of the piston head, between the cylinder chamber and the compensation space, a damping valve arrangement is provided so that there is a damping of the suspension. It is a decisive disadvantage to be sure, that the damping effect is permanently preset, i.e. is not variable. Underlying the present invention, therefore, is the problem of further developing a hydropneumatic suspension system of the above category type in such a way that the damping is variable at will, and, namely, especially in dependence on load.

According to the invention, this is achieved by means of the choke valves of the damping valve, the valve elements being biased with springs, in which system the bias tension of the springs is variable by setting means acting on these springs in common in a closing or opening direction of the valve elements.

By reason of the invention, it is possible to drive the setting means by the pressure, in each case, present inside the gas storer, so that the setting means on their part drive the choke valves for the change of their damping effect in dependence on the load-dependent pressure inside the gas storer. Thus, there can especially be achieved, according to the invention, the result that in the unloaded state of the hydraulic cylinder there is provided a stronger stroke damping than in the loaded state, and that then the counterstroke damping in the unloaded state is low and is high in the loaded state. This load-dependent damping shift, according to the invention, is therefore of special advantage, since in the unloaded state the spring or spring bias tension of the gas storer is lower than in the loaded state, for without this adjustment the unloaded cylinder in the stroke could easily "strike through", and in the counterstroke "get stuck" by a then too high damping. In the loaded state, a low damping for the stroke is desired, so that the piston of the hydraulic cylinder, despite the then high bias tension of the gas storer, will spring in well, and in the counterstroke (spring release), a high damping is desired, so that the piston, by reason of the gas storer being under high pressure, will not spring out to rapidly, but will spring out under damping.

Alternatively to this, it can be achieved by the invention, however, also for certain cases of application, that in the unloaded state of the cylinder-piston unit, both the springing-in and also the springing-out damping are low and in the loaded state both dampings are high.

The damping shift, according to the invention, occurs between the high and low damping and vice versa, of course, steadily, i.e. in a "medium" load case, and also in each case, a "medium" damping is set in.

Further advantageous development features of the invention are contained in the following specification.

With the aid of the drawing, in the following description, the invention is to be explained in detail by way of example. In the drawing:

FIG. 1 shows a longitudinal section through a hydropneumatic cylinder-piston unit of the suspension system of the invention during the springing-in;

In the various figures of the drawing, like parts and components are designated, in each case, with the same reference numbers.

Figure 1:
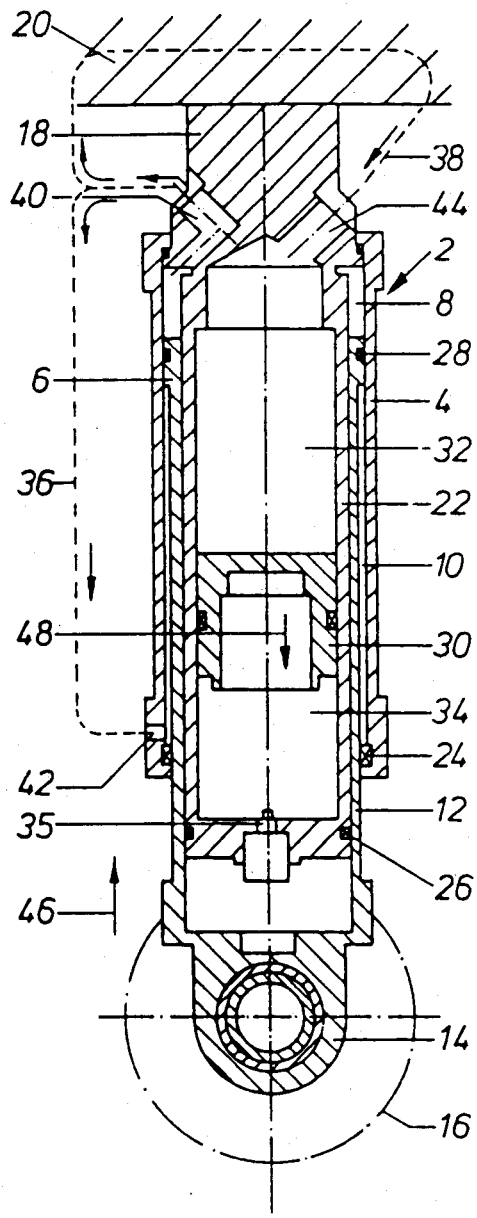
Figure 2:
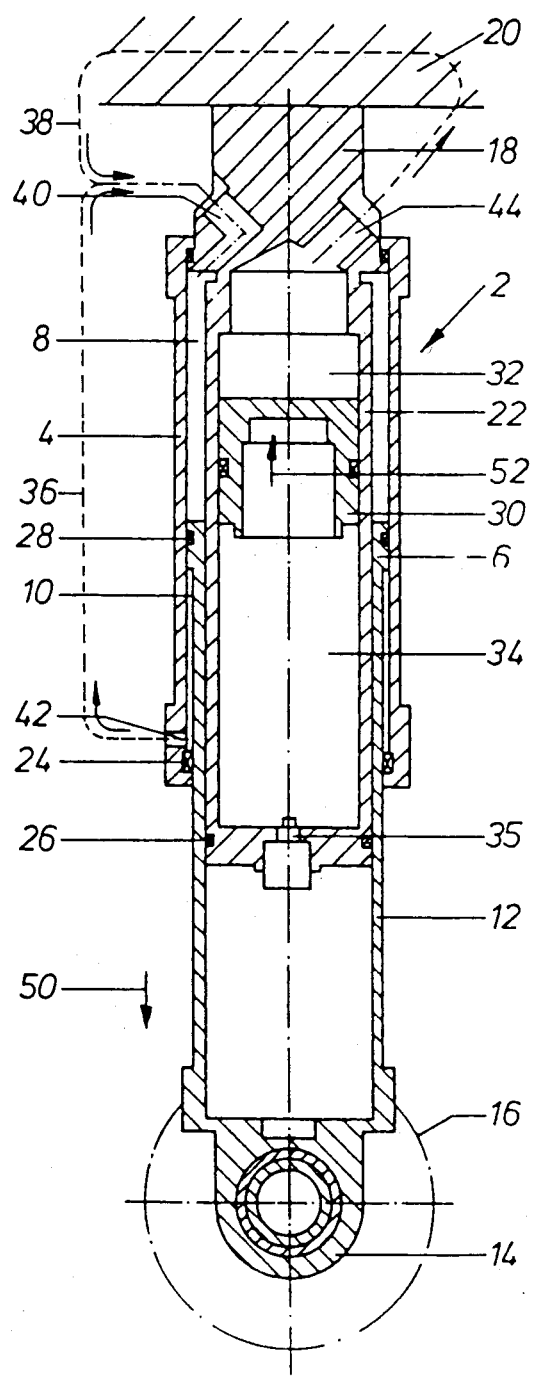
FIG. 2 shows a longitudinal section analogous to FIG. 1 during the springing-out.

In FIGS. 1 and 2, there is represented, in each case, a cylinder-piston unit 2 of a hydropneumatic suspension system according to the invention. This cylinder-piston unit 2 consists of a hydraulic cylinder 4, in which there is guided a piston head 6. The piston head 6 divides the cylinder 4 into two chambers 8 and 10 filled with a hydraulic medium. The piston head 6 is mechanically connected with a piston rod 12, which is sealed against the cylinder 4 at the position the piston rod 12 is led outward from the cylinder 4. On the free outward-guided end, the piston rod 12 has a connecting piece 14 which is connectable with a mass to be damped or to be sprung (indicated merely by a dot-and-dashed circle 16), in particular a vehicle wheel. The cylinder 4 is to be fastened by an oppositely lying head part 18 of the cylinder 4, for example, to a vehicle chassis 20, likewise only indicated by dashed lines.

Preferably—as is to be perceived in FIGS. 1 and 2—the piston rod 12 is constructed as a hollow cylindrical part, and the piston head 6 is an annular part. Inside the cylinder 4, there is an inside tube 22 fastened to the head part 18, being coaxially arranged. The inside tube 22 extends about up to the end of the cylinder 4 lying opposite the head part 18 of the cylinder 4, or also—as represented—extends somewhat farther out of the cylinder 4 as well as extending with minimum play through the annular piston head 6 and into the hollow cylindrical piston rod 12. The piston head 6, therefore, is enclosed by the inside tube 22 in a cylinder annular space formed between the inside tube 22 and the cylinder 4 with minimum circumferential play. By reason of this formation, the chambers 8 and 10, separated by the piston 6, are constructed as annular chambers.

This preferred embodiment of the cylinder-piston unit 2 is of special advantage inasmuch as it obtains a very high stability for the absorption of extremely high transverse forces, since the hollow cylindrical piston rod 12 is advantageously guided with its inside wall, through the entire stroke of the piston head 6, against the outer shell of the inside tube 22.

For the sealing of the piston rod 12, on the one hand, there is arranged, between the piston rod 12 and the cylinder 4, an outer sealing ring 24. On the other hand, between the inside tube 22 and the inner circumference of the piston rod 12, there is arranged an inner sealing ring 26. The piston head 6 is sealed against the cylinder 4 by a piston sealing ring 28.

Inside the inner tube 22 there is guided, further, a separating piston 30 which is freely movably, i.e. floating. This separating piston 30 separates a compensation space 32 arranged on its side facing the head part 18, filled with hydraulic medium, from a gas storer 34 acting as a pneumatic spring, lying on the other side of the separating piston 30. Inside the gas storer 34 there is arranged an elastically compressible medium, for example air, and namely if need be, under an excess pressure to bring about a bias tension.

In the form of the invention shown, on the one hand, the inner tube 22 is provided with an opening 35 in a portion of its bottom wall facing the outward-conducted end of the piston rod 12, while, on the other hand, the hollow cylindrical piston rod 12 is closed in a gas-tight arrangement in the portion of its end protruding from the cylinder 4. Thus, the gas storer 34 advantageously obtains a large volume, which has an influence on the pneumatic spring force and/or spring characteristic curve of the cylinder-piston unit 2 of the invention. It lies, however, likewise within the scope of the invention to construct the inner tube 22 gas-tightly closed in its free end portion facing the outward-guided end of the piston rod 12, in which case, then, the piston rod 12 can have a ventilation opening in its portion extending outward beyond the inner tube 22. This alternative (not represented) has likewise an effect on the spring characteristic of the pneumatic spring formed by the gas storer 34.

The upper annular chamber 8 adjacent to the head part 18 is connected, on the one hand, with the lower annular chamber 10 disposed away from the head part 18, as well, on the other hand, being also connected with the compensation space 32, and, namely, preferably by external connecting lines 36, 38 (drawn in broken lines in FIGS. 1 and 2). For the above connections, the upper annular chamber 8 has a connection 40, the lower annular chamber 10 has a connection 42, and the compensation space 32 has a connection 44.

In an alternative form (not represented) of the invention, the connections described above could, however, also be formed internally, and, namely, by at least one passageway opening connecting the annular chambers 8 and 10 through the piston head 6, and a passageway connecting the upper annular chamber 8 with the compensation space 32 through the head part 18.

The theoretical functioning of the cylinder-piston unit 2 of the invention is now set forth as follows:

In FIG. 1 the springing-in process is represented, in which the piston head 6 is moved by the piston rod 12 in the direction of arrow 46 into the cylinder 4. Thus, the hydraulic medium is expelled from the upper annular chamber 8 and, namely, on the one hand, into the lower annular chamber 10, but on the other hand, the hydraulic medium is also expelled into the compensation space 32, in which process the volume of the hydraulic medium displaced into the compensation space 32 corresponds to the volume moved into the cylinder 4 by the piston rod 12. By this moved-in volume of the piston rod 12, it is brought about, namely, that the lower annular chamber 10 can receive less hydraulic medium than is displaced from the upper annular chamber 8. The hydraulic medium flowing into the compensation space 32 brings about a displacement of the separating piston 30 in the direction of arrow 48 towards the gas storer 34, so that the volume of the gas storer 34 is thereby reduced, whereby the pressure of the gas medium present inside the gas storer 34 is increased by compression. This brings about a spring mounting of the in-thrust movement of the piston head 6 in the direction of arrow 46. The in-thrust movement ends when an equilibrium is achieved between the load and the inner pressure of the gas storer 34 (equilibrium between the force acting on the cylinder-piston unit 2 and the force of "gas pressure times acted-upon surface of the separating piston 30").

In FIG. 2, there is represented the springing-out process, in which the piston rod 12 together with the piston head 6 move out of the cylinder 4 in the direction of arrow 50. This occurs, for example, on a reduction of the load. In this case, the pressure inside the gas storer 34 provides that the separating piston 30 is shifted in the direction of arrow 52 towards the head part 18 and, in the process, the hydraulic medium is expelled from the compensation space 32. This displaced hydraulic medium flows back into the upper annular chamber 8. Furthermore, the hydraulic medium flows from the lower annular chamber 10 back into the upper annular chamber 8. This springing-out movement also ends on the reaching of an equilibrium between the load and the inner pressure of the gas storer 34.

The suspension effect of the hydropneumatic cylinder-piston unit 2 of the invention is achieved, accordingly, by compression and expansion of the gas colume inside the gas storer 34.

Figure 3:
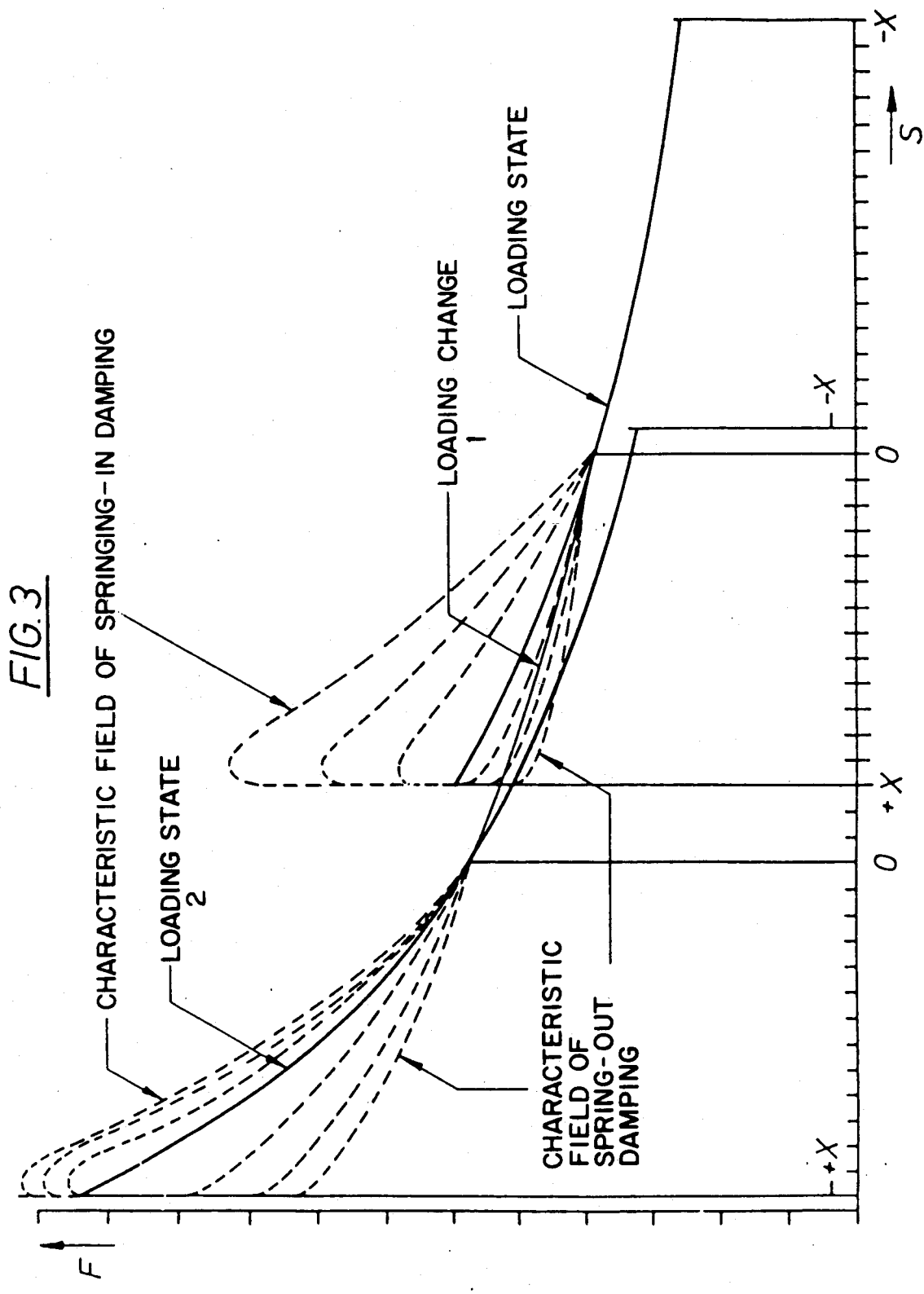
FIG. 3 shows a spring characteristic line diagram with two load conditions of the gas storer of the cylinder-piston unit of the invention.

In FIG. 3 there is presented a spring characteristic curve diagram of the gas storer 34, in which the force F generated by the gas storer 34 is plotted on the ordinate axis and the path or piston stroke S of the cylinder-piston unit 2 is plotted on the abscissa axis. There, for two loading states 1 and 2, the spring characteristic curves are drawn as solid lines (loading state 1—low load; loading state 2—high load). With "0", there is characterized in each case the static, neutral position, while "+X" designates the maximal springing-in, and "−X" designates the maximal springing-out. From this, it is well perceived that the suspension of the gas storer 34 has a progressive course, i.e., the spring characteristic curve with a progressive rise becomes all the steeper at the higher load, i.e. when the pressure in the gas storer 34 is higher. This spring characteristic is very favorable especially for the traveling behavior of a vehicle, for a nonlinear progressive spring characteristic curve has the advantage that the spring system does not so easily tend to resonant rise, since it has no frequency of its own. The resonant rise effect could occur only through an excitation corresponding to the spring characteristic. Despite the nonlinear spring characteristic of the cylinder-piston unit 2 of the invention, there is nevertheless provided according to the invention an additional damping of the suspension system, which is to be explained below.

Figure 4:
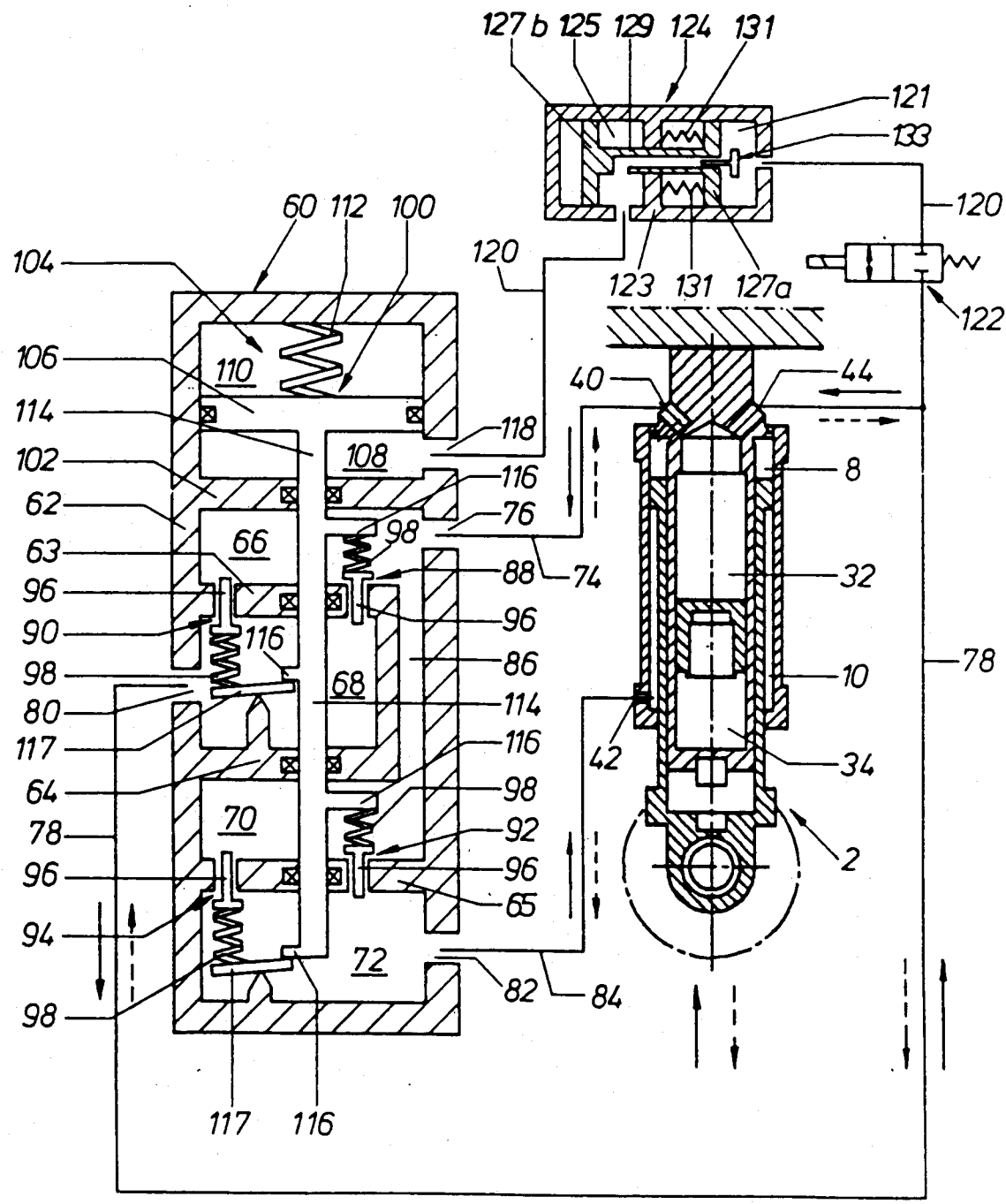
FIG. 4 shows a simplified theoretical representation of a suspension system according to the invention consisting essentially of a cylinder-piston unit and of an external damping valve connected thereto.
Figure 5:
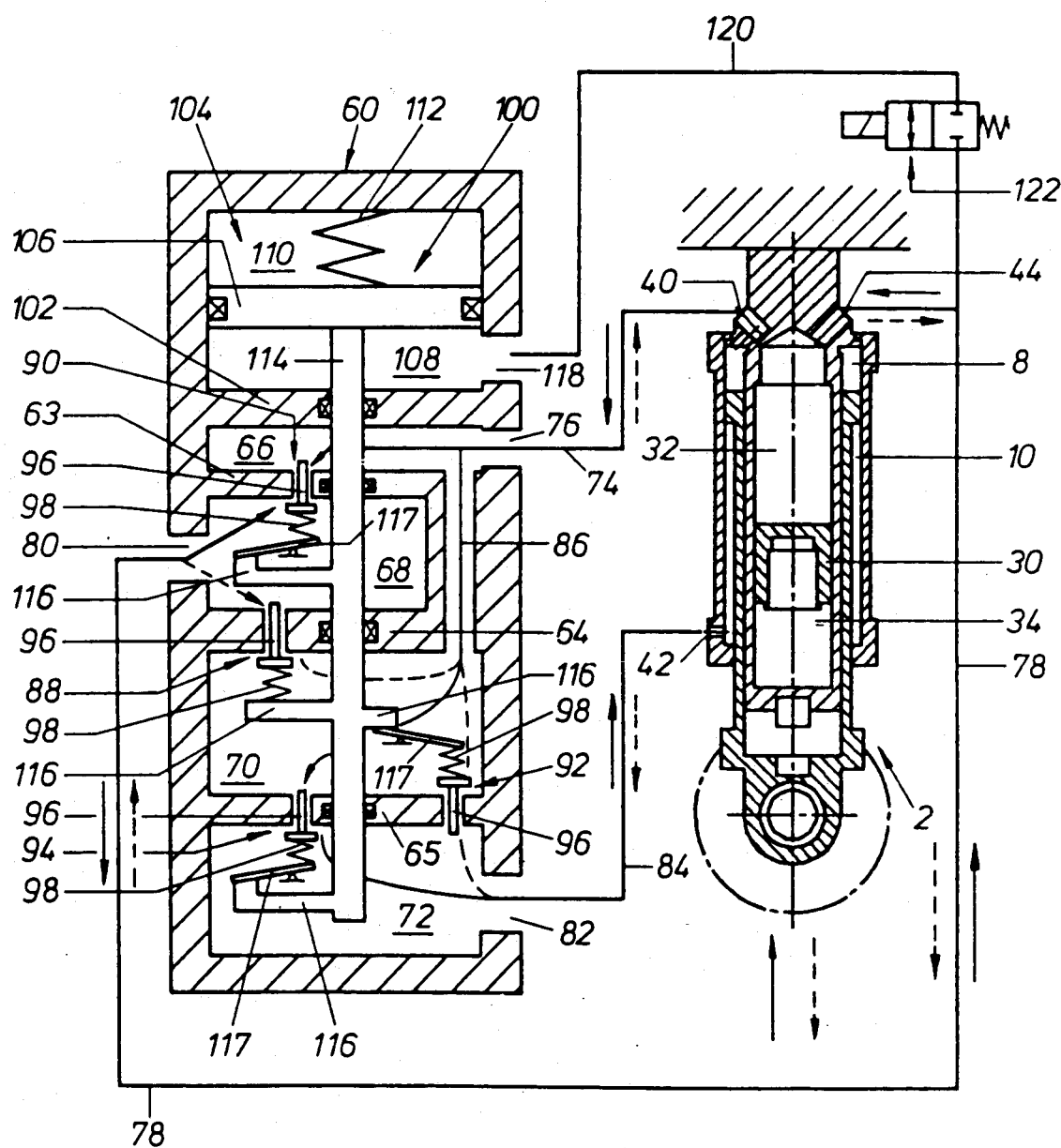
FIG. 5 shows a representation analogous to FIG. 4 having an alternative formation of the damping valve.
Figure 6:
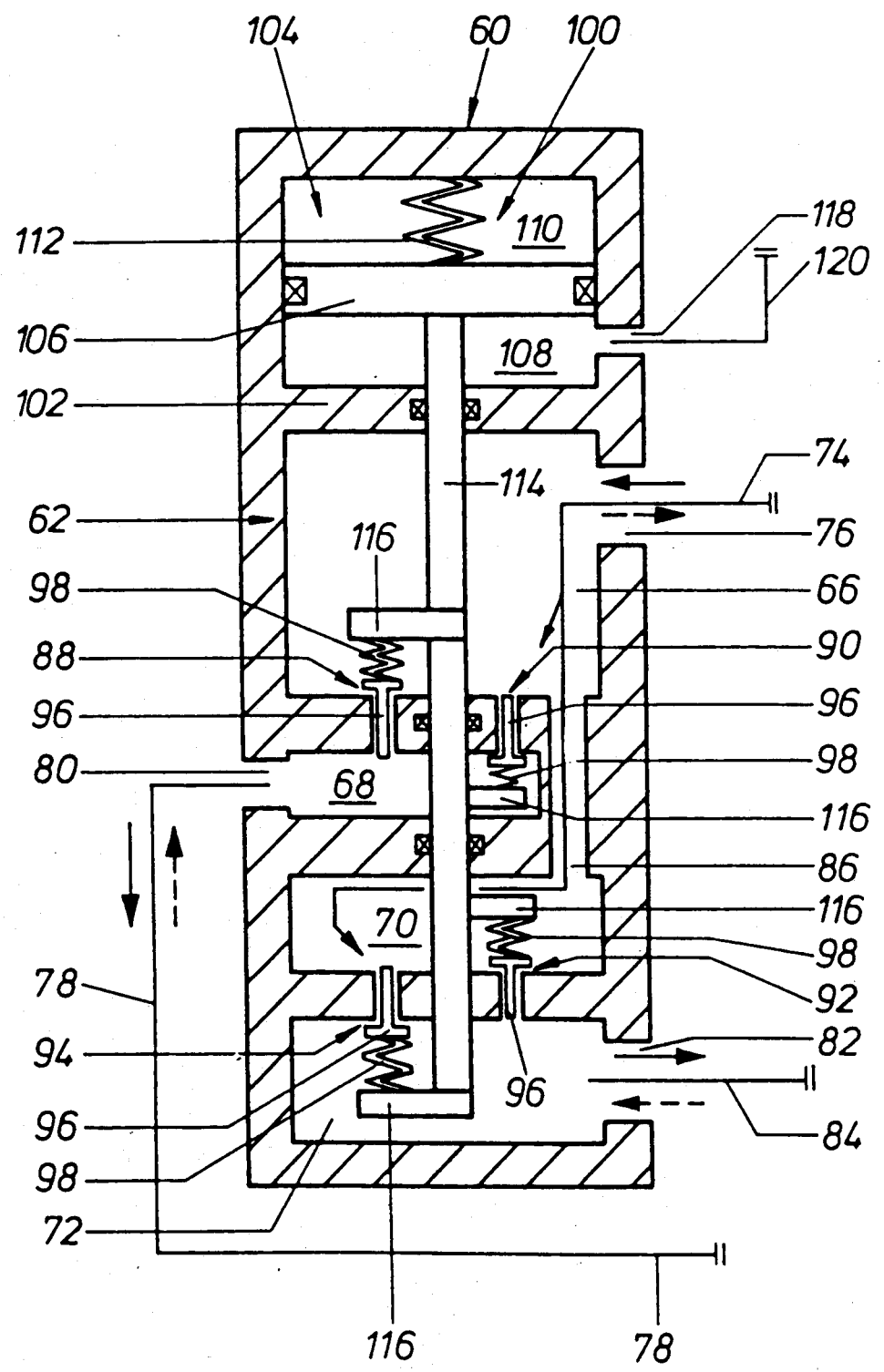
FIG. 6 shows a representation of a damping valve, as in FIGS. 4 and 5, having a further alternative formation.

In FIGS. 4 to 6 there are schematically represented three possible embodiments of a damping valve 60 according to the invention. The cylinder-piston unit 2 forms together with the damping valve 60 a hydropneumatic shock and vibration damper. In the hydropneumatic suspension of the invention, the damping valve 60 is constructed preferably as an external component with respect to the cylinder-piston unit 2, i.e. separate in space from the cylinder-piston unit 2. In contrast, it would be likewise possible, to be sure, to arrange damping or choke valves in internal connections between the annular chambers 8, 10 (piston passageway opening) and/or between the upper annular chamber 8 and the compensation space 32 (passageway in the head part 18). To be sure, the preferred external embodiments represented and described here are especially advantageous inasmuch as there is avoided any warming of the cylinder-piston unit 2, and, namely, especially any warming of the gas storer 34 when the hydraulic medium is heated as a result of the choking or damping. Advantageously, there are avoided heat-change conditioned changes of the gas pressure in the gas storer 34 and, therewith, also undesired changes of the spring characteristic associated with undesired level changes in an advantageous manner.

According to FIGS. 4 and 6, the damping valve 60 of the invention consists of a valve casing 62, in which successively, there are formed a first valve chamber 66, a second valve chamber 68, a third valve chamber 70 and a fourth valve chamber 72, which are separated from each other by partitions 63, 64 and 65. The first valve chamber 66 includes a first connection 76 for the connection of a connecting line 74, the second valve chamber includes a second connection 80 for the connection of a connecting line 78, and the fourth valve chamber 72 includes a third connection 82 for the connection of a connecting line 84. The first valve chamber 66 communicates through a casing channel 86 directly with the third valve chamber 70. The first valve chamber 66 and the second valve chamber 68 are joined by two oppositely directed choke valves 88, 90, arranged in passageways extending through the partition 63. In like manner, the third valve chamber 70 and the fourth valve chamber 72 are also connected by two oppositely directed choke valves 92, 94, arranged in passageways extending through the partition 65. Each choke valve 88, 90, 92 and 94 has a valve element 96 represented in a severely simplified manner.

The damping valve 60 according to FIG. 5 corresponds essentially to that described above with respect to FIG. 4 or 6, in which like parts are designated with the same reference numbers. However, to be sure, the choke valve 88 shown in FIG. 5 for the springing-out damping of the flow from the compensation space 32 into the upper annular chamber 8 is arranged not in the partition 63 between the first valve chamber 66 and the second valve chamber 68, but in the partition 64 between the second valve chamber 68 and the third valve chamber 70.

According to the invention, in all of the embodiments, in each case, the connection 76 of the first valve chamber 66 is joined by the connecting line 74 with the connection 40 of the upper annular chamber 8 of the cylinder-piston unit 2. Further, the connection 80 of the second valve chamber 68 is connected by the connecting line 78 with the connection 44 of the compensation space 32, and the connection 82 of the fourth valve chamber 72 is connected by the connecting line 84 with the connection 42 of the lower annular chamber 10 of the cylinder-piston unit 2.

By reason of the structure described above for the damping valve 60 according to the invention, as well as the allocation of the connections (circuits between damping valve 60 and cylinder-piston unit 2), the individual choke valves have the following functions:

Choke valve 90—Damping of the springing-in flow from the upper annular chamber 8 to the compensation space 32;

Choke valve 94—Damping of the springing-in flow from the upper annular chamber 8 to the lower annular chamber 10;

Choke valve 88—Damping of the springing-out flow from the compensation space 32 to the upper annular chamber 8; and Choke valve 92—Damping of the springing-out flow from the lower annular chamber 10 to the upper annular chamber 8.

The damping valve 60 of the invention has the following manner of functioning:

1. Springing-in (solidly drawn arrows).

In the springing-in of the cylinder-piston unit 2, the hydraulic medium is displaced from the upper annular chamber 8 and flows through the connecting line 74 into the first valve chamber 66 of the damping valve 60. A first partial volume of the expelled hydraulic medium flows from the first valve chamber 66 through the casing channel 86 into the third valve chamber 70, then from the third valve chamber 70 through the choke valve 94 into the fourth valve chamber 72, and then from the fourth valve chamber 72 through the connecting line 84 into the lower annular chamber 10 of the cylinder-piston unit 2. In correspondence to the abovementioned volume of the piston rod 12 thrust into the cylinder 4, a second partial volume of the dydraulic medium flows from the first valve chamber 66 through the choke valve 90 into the second valve chamber 68, and then from the second valve chamber 68 through the connecting line 78 into the compensation space 32 of the cylinder-piston unit 2. Thus—as described above—by the displacement of the separating piston 30 in the direction of arrow 48, the volume of the gas storer 34 is reduced and thereby a spring action is achieved. With respect to the springing-in damping, according to the invention the two choke valves 90 and 94 are switched open in a parallel relationship. The other two choke valves 88 and 92, in each case, act in the springing-in as nonreturn valves and are, therefore, closed.

2. Springing-out (arrows drawn in broken lines).

In the springing-out, the flow direction in each case is reversed. This means that, on the one hand, from the compensation space 32 by reason of the pneumatic pressure of the gas storer 34, the hydraulic medium is displaced and passes through the connecting line 78 into the second valve chamber 68, and then from the second valve chamber 68 through the choke valve 88 either directly into the first valve chamber 66 (FIGS. 4 and 6), or according to FIG. 5 the hydraulic medium first flows into the third valve chamber 70, and then from the third valve chamber 70 through the casing channel 86 into the first valve chamber 66. Further, also the corresponding partial volume of the hydraulic fluid passes from the lower annular chamber 10 through the connecting line 84, then through the fourth valve chamber 72, then through the choke valve 92, then through the third valve chamber 70 and then through the casing channel 86 into the first valve chamber 66. From the first valve chamber 66, the entire volume of the hydraulic fluid then passes through the connecting line 74 back into the upper annular chamber 8 of the cylinder-piston unit 2. In the springing-out, accordingly, the choke valves 92 and 88 are switched open in a parallel relationship. The other choke valves 90 and 94, in each case, are closed in the spring-out by reason of the nonreturn function thereof.

By using the damping valve 60 of the invention, consequently, in the springing-in and springing-out of the cylinder-piston unit 2, there is achieved a damping in that the pumped-over hydraulic medium from the individual chambers of the hydropneumatic cylinders flows, in each case, through two parallel-switched choke valves 90, 94 or 88, 92, which makes possible a very individual damping adjustment, since, in each case, two partial flows can be damped differently in the springing-in and springing-out. The connection 76 of the damping valve 60 forms in the springing-in a common input as well as, in the springing-out, a common output for the two parallel flow paths. In the springing-in, the connections 80 and 82 form separate outlets, and in the springing-out, the connections 80 and 82 form separate entries for the two flow paths.

The choke valves 88 to 94 are constructed, according to the invention, in such a manner that with increasing flow velocity of the hydraulic medium, the choke action in the choke valves becomes stronger, so that advantageously in dependence on the springing-in and springing-out velocity, respectively, of the hydropneumatic cylinder-piston unit 2, the movement of the mass to be damped is damped more or less strongly.

In addition to this so-far described theoretical manner of functioning of the damping valve 60, it is now provided according to the invention to influence the damping valve 60 or its choke valves 88 to 94 in such a way that the damping is variable especially in dependence on the load state of the cylinder-piston unit 2. This measure according to the invention is now to be explained below in detail with the aid of FIGS. 4 to 6.

The valve elements 96 of the four choke valves 88 to 94 are, for this purpose, biased according to the invention, in each case, by a spring 98 in the closing direction, i.e. into a direction of the particular choke valve which is opposite to the flow being damped. According to the invention, for the altering or influencing of the damping, the bias tension of each of the springs 98 is variable in common with each other by setting means 100 acting in common on each of these springs. The setting means 100 are now to be explained below in detail.

Above the first valve chamber 66 of the damping valve 60, a partition 102 is positioned on the side of the first valve chamber 66 facing away from the second valve chamber, to provide a cylinder chamber 104. Inside this cylinder chamber 104 there is guided a piston head 106, which subdivides the cylinder chamber 104 into a pressure medium chamber 108 adjacent to the partition 102, and a spring chamber 110 disposed away from the partition 102.

Inside the spring chamber 110 there is arranged a setting spring 112 to force the piston head 106 in the direction of the partition 102, or in the direction of the valve chambers 66 to 72, which spring 112, in the example shown, is constructed as a biased spiral pressure spring. It lies, however, within the scope of the invention, to also provide another biased spring within the spring chamber 110, such as for example, a compressible gas which is under bias pressure for the formation of a pneumatic pressure spring.

This piston head 106 is mechanically connected with a piston rod 114 which extends, in a sealed arrangement, through an opening in the partition 102 into the first valve chamber 66; further extends, in a sealed arrangement through an opening in the partition 63 into the second valve chamber 68; still further extends, in a sealed arrangement, through an opening in the partition 64 into the third valve chamber 70; as well as extending further, in a sealed arrangement, through an opening in the partition 65 into the fourth valve chamber 72.

The piston rod 114 has, for each valve element 96 of the choke valves 88 to 94, a counterbearing element 116 extending outwardly from the sides thereof in the direction of the respective valve element 96, and, namely, on that side on which the associated valve element 96 is to be acted upon by bias yension, and on which side, consequently, is also where the associated spring 98 is arranged.

Depending on the type of "direction" desired for the adjustment of the bias tension of the respective spring 98 (increase/reduction of the bias tension), the spring 98 is arranged either directly between the valve element 96 and the allocated counterbearing element 116 of the piston rod 114 (FIG. 4, choke valves 88, 92; FIG. 5, choke valve 88; FIG. 6, all choke valves 88 to 94), or else between the valve element 96 and an additional, mechanical "force-reversing element" 117 under bias tension (FIG. 4, choke valves 90, 94; FIG. 5, choke valves 90, 92, 94). These force-reversing elements 117 are cosntructed, in the examples shown, as levers supported pivotally in the manner of rockers in the casing 62, the spring 98 being arranged, in each case, between a lever section and the valve element 96, with the counterbearing element 116 for the adjustment of the bias tension of the spring 98 acting against the opposing lever section.

In the pressure medium chamber 108, according to the invention, a connection 118 is provided for the connection of a connecting line 120, which is connected, according to the invention, by a switching valve 122 to the connection 44 of the compensation space 32 of the cylinder-piston unit 2 (see FIGS. 4 and 5). In the case of FIG. 4, in the connecting line 120 there is provided a hydraulic control valve 124 for a pressure reversal, as well as preferably to provide a safety valve. This control valve 124 has a first pressure chamber 121 connected by the connecting line 120 to the switching valve 122, and a second pressure chamber 125 connected by the connecting line 120 to the connection 118 of the pressure medium chamber 108 of the damping valve 60. Inside the two pressure chambers 121 and 125 there is guided, in each case, a piston head 127a, 127b. The piston heads 127a, 127b are joined mechanically with one another by a piston rod 129 extending, in a sealed arrangement, through an opening in the partition 123. Between the piston head 127a and the partition 123 there are arranged one or more pressure springs 131. The piston rod 129 can—as shown—have a hollow construction, so that it connects the pressure chambers 121 and 125 together. In this connection, however, there is arranged a nonreturn valve 133 in such a manner that, in the event of a pressure drop in the first pressure chamber 121, the pressure in the second pressure chamber 125 can escape through the nonreturn valve 133.

The pressure reversal functioning of the control valve 124 is as follows. A high input-side pressure in the first pressure chamber 121 brings about a displacement of the piston heads 127a, 127b against the force of the spring(s) 131, so that the volume of the second pressure chamber 125 between the partition 123 and the piston head 127b increases, which results in a reduction of the outlet-side pressure of the second pressure chamber 125 ("pressure-reversal"). In the case of a low input-side pressure in the first pressure chamber 121, the piston heads 127a, 127b under spring force shift in the opposite direction, so that through the volume reduction in the second pressure chamber 125, the outlet-side pressure of the second pressure chamber 125 rises (likewise "pressure reversal").

In the following there is explained the functioning of the load-dependent damping adjustment, according to the invention.

As a pressure source for acting upon the pressure medium chamber 108, there is used, according to the invention, the load-dependent pressure through the switching valve 122 and, in the embodiment according to FIG. 4, through the pressure reversal control valve 124, and the load-dependent pressure prevailing in the compensation space 32 of the cylinder-piston unit 2, which corresponds to the pressure inside the gas storer 34. This pressure is set independently on the load of the cylinder-piston unit 2; when the pressure is greater, the greater the load is, and vice versa.

By the drive, according to the invention, of the setting means 100 of the damping valve 60, and with the load-dependent pressure inside the compensation space 32, advantageously, the damping can be adapted to the particular static load. For this purpose, after a static change of the load (cf. also the diagram in FIG. 3), according to the invention, either once by a brief actuation of the switching valve 122 or else continuously, i.e. "dynamically", the prsssure in the compensation space 32 is "inquired", i.e. led through the connecting line 120 directly (FIG. 5) or else with a "reversed" magnitude through the control valve 124 (FIG. 4) into the pressure medium chamber 108. Depending on the amount of the particular pressure present in the gas storer 34, or in the compensation space 32, the pressure medium flows either into the pressure medium chamber 108 or out of the pressure medium chamber 108. The higher the pressure is inside the pressure medium chamber 108, the greater will be the action against the bias tension of the setting spring 112, whereby the bias tension of the springs 98 of the choke valves 88 to 94 is, in each case, changed.

In the embodiment according to FIG. 4, in the unloaded state of the cylinder-piston unit 2, a low pressure is present in the compensation space 32. This low pressure is conducted through the switching valve 122 into the first pressure chamber 121 of the control valve 124. The control valve 124 brings about a pressure reversal in the manner already described above, so that in the second pressure chamber 125 there is present a high pressure which is conducted through the connecting line 120 into the pressure medium chamber 108 of the damping valve 60. This high pressure acts against the setting spring 112, so that the piston rod 114 is shifted slightly in the direction of the setting spring 112. This brings about a reduction of the bias tension of all the springs 98 of the choke valves, and, namely, in the case of the choke valves 90 and 94 conditioned by the force-reversal elements 117. This has the consequence, according to the invention, that with a slight load on the cylinder-piston unit 2 there is also assured a slight damping both in the spring-in and also in the springing-out direction.

In contrast, with a high load, the high pressure of the compensation space 32 is reversed over the control valve 124 into a low pressure, so that this low pressure is present also in the pressure medium chamber 108 of the damping valve 60. Consequently, the bias tension of the setting spring 112 can increase the bias tension of the individual springs 98 of the choke valves, so that, in the loaded state, there is assured a high damping in both the springing-in and in the springing-out direction.

In the case of a possible pressure drop on the side of the gas storer 34, or of the compensation space 32, the control valve 124 acts, according to the invention, as a safety valve, which in this case brings about a maximal damping. This occurs through the fact that on a pressure drop in the first pressure chamber 121, the nonreturn valve 133 opens, so that through the connecting line 120, the pressure medium chamber 108 now becomes pressureless, thus causing the springs 98 of the choke valves to be acted upon by the setting spring 112 with a maximal bias tension.

In the embodiment according to FIG. 5, in contrast, it is achieved that, with a high load, a low springing-in damping and a high springing-out damping are set in and, with a low load, for the support of the spring and for the prevention of "striking through", a high springing-in damping and a low springing-out damping are set in, as is indicated by the damping characteristic lines drawn in broken lines, in addition to the solidly drawn spring characteristic lines.

The above occurs through the fact that, in the low-loaded state, the low pressure of the compensation space 32 is fed through the connecting line 120 to the pressure medium chamber 108. The setting spring 112 now acts on the piston rod 114 to change the springs 98 of the individual choke valves in respect to their bias tension as follows: There is an increase of the bias tension of the springs 98 of the choke valves 90 and 94 (over force-reversal elements 117); and a reduction of the bias tension of the choke valves 88 (directly) and 92 (over the force-reversal element 117).

In the loaded state of the cylinder-piston unit 2, there is a high pressure present in the pressure medium chamber 108, which counteracts the bias tension of the setting spring 112, so that the bias tensions of the individual springs 98 are altered as follows: There is a reduction of the bias tension of the springs 98 of the choke valves 90 and 94; and an increase of the bias tension of the springs 98 of the choke valves 88 and 92.

In FIG. 6 there is shown, by way of example, a further alternative embodiment, in which context, however, still further alternative embodiments to this would be conceivable. In this embodiment, with low pressure in the pressure medium chamber 108, by the action of the setting spring 112, the bias tensions of the springs 98 of the choke valves 90 and 94 are reduced. At high pressure in the pressure medium chamber 108, the bias tension of the spring 112 is counteracted, so that the bias tensions of the springs 98 of the choke valves 88 and 92 are reduced, and the bias tensions of the springs 98 of the choke valves 90 and 94 increased. Thus, possibly by a pressure-reversal valve analogous to the control valve 124 according to FIG. 4, there can be achieved a reversal of these functions.

By a suitable arrangement of the damping valve 60, it is possible, according to the invention, also to achieve the result that the springing-out damping is controlled proportionally to the load, whereas the springing-in damping is controlled inversely proportionally to the load.

Figure 7:
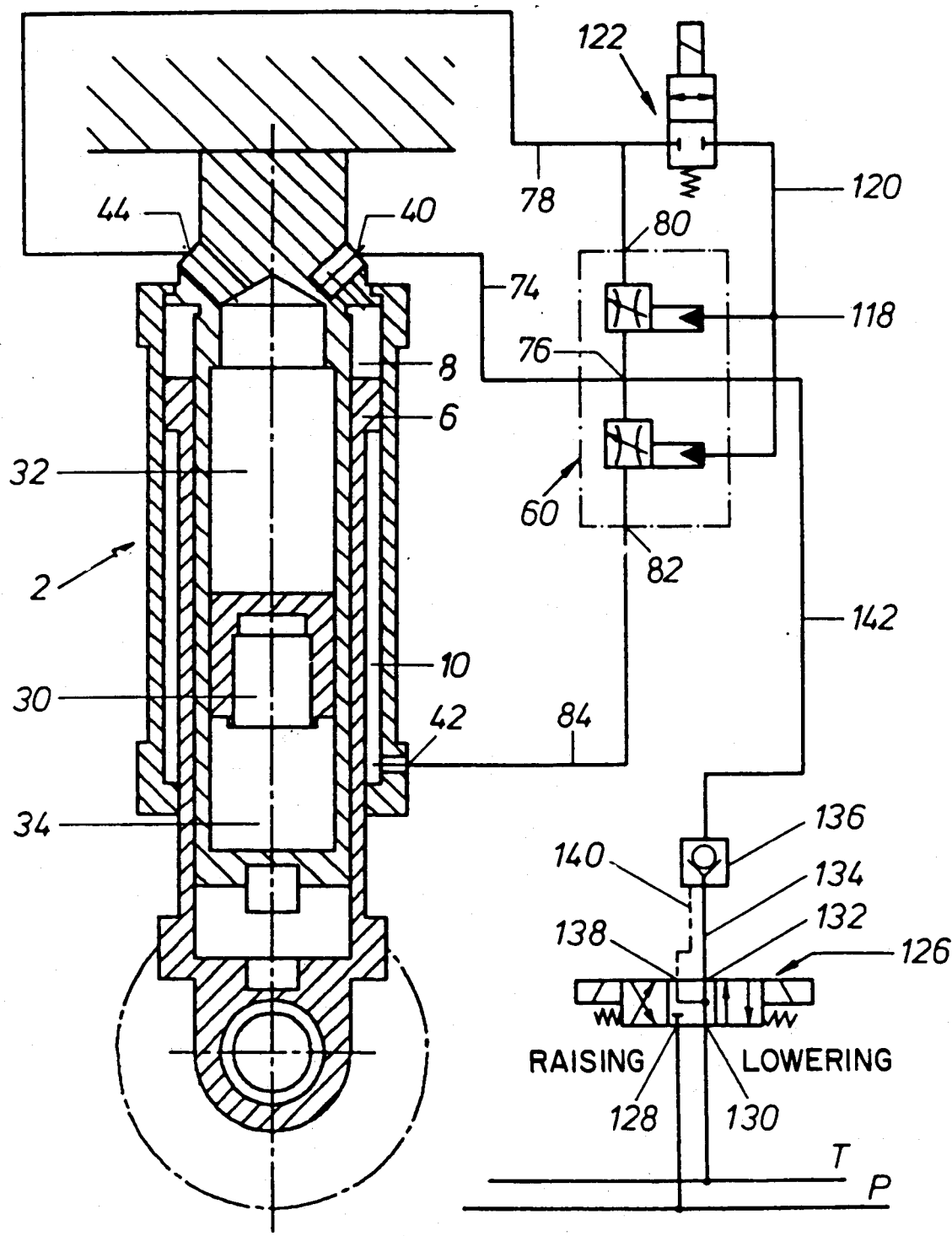
FIG. 7 shows a theoretical hydraulic circuit of the suspension system of the invention for a load-dependent level adjustment.

In an advantageous further embodiment of the invention, shown theoretically in FIG. 7, a load-dependent leveling of the hydropneumatic cylinder-piston unit 2 of the invention is possible, which is especially advantageous for the application in vehicles, since thereby, independently of the load state, their freedom with respect to the ground can be maintained about constant, and, namely, statically and/or dynamically. This is to be perceived in FIG. 3, since the static or neutral position "0" is the same in both cases of load, although the pressure or the force "F" of the gas storer 34 is different. Thus, the suspension system of the invention is very comfortable, since maximal springing-in and springing-out paths "+X" and "−X" remain assured.

In the hydraulic switching plan shown in FIG. 7, the damping valve 60 of the invention is shown severely simplified by a switching symbol. Nevertheless, like parts are designated with the same reference numbers as in the above figures already described.

According to the invention shown in FIG. 7, at least one leveling valve 126 is connected to a hydraulic system, especially of a motor vehicle, and, namely, having a first input 128 disposed onto a pressure line P, and having a second input 130 disposed onto a reflux line T. A flow outlet 132 of the leveling valve 126 is connected to a connecting line 134 having a nonreturn valve 136. A control outlet 138 of the leveling valve 126 is connected to a control line 140, drawn in broken lines, and likewise connected with the nonreturn valve 136. The nonreturn valve 136 is connected on the outlet side thereof to a connecting line 142, which is connected to the upper annular chamber 8 of the hydropneumatic cylinder-piston unit 2, for which purpose, the connecting line 142 can be connected at a suitable place, for example, at the connection 40 or—as shown—at the connection 76 of the damping valve 60.

According to the invention, the leveling valve 126 is constructed in such a way that in a first switching position (raising), the first input 128 is connected to the flow outlet 132, and the second input 130 is connected to the control output 138. In contrast to this, in a second switching position (lowering), the first input 128 is connected to the control output 138, and the second input 130 is connected to the flow outlet 132. In the rest position, shown in FIG. 7, the pressure connection P is closed, and both outlets 132 and 138 are connected to the second input 130, which is connected to the reflux line T.

In the following, there is described the functioning of the above-mentioned leveling.

With a load on the cylinder-piston unit 2, the piston head 6 is displaced into the cylinder, as shown in FIG. 1, until the pressure in the gas storer 34 has risen to a pressure corresponding to the applied higher load. The separating piston 30, between the gas storer 34 and the compensation space 32, is then shifted downward. In the case when the cylinder-piston unit 2 of the invention is used in a vehicle, this results in a lowering and, also therewith, a reduction of the freedom of the vehicle with respect to the ground. This is to be counteracted via the leveling according to the invention.

Accordingly, the leveling valve 126 is shifted into the first switching position, so that, from the vehicle hydraulic system, the hydraulic medium is supplied through the non-return valve 136 and through the connecting line 142 to the upper annular chamber 8 of the culinder-piston unit 2. The piston head 6 is now shifted downward inside the cylinder 4, whereby the vehicle is correspondingly lifted. In the process, also, a corresponding amount of the hydraulic medium flows from the lower annular chamber 10 into the upper annular chamber 8. None of the hydraulic medium flows into the compensation space 32, to be sure, since, after all, the load and therewith also the pressure inside the gas storer 34, as well as the position of the separating piston 30, now remains constant. On reaching a desired level, or a desired freedom of a vehicle with respect to the ground, the leveling valve 126 is switched back into its rest position.

For the lowering, the leveling valve 126 is switched into its second switching position, whereby, through the control line 140, the nonreturn valve 136 is hydraulically opened. The hydraulic medium can now flow back from the upper annular chamber 8 through the connecting line 134 and through the leveling valve 126 to the reflux line T. Thereby, there occurs a lowering of the cylinder-piston unit 2. After reaching a desired level, the leveling valve 126 is again switched into its rest position, whereby the nonreturn valve 136 closes again.

When the suspension system of the invention is used with the leveling, for example, in a motor vehicle, then the particular level position can be ascertained over preferably inductive path meters. The adjustment of the level position then occurs by an automatic operation of the leveling valve 126, for example, by means of an electronic control.

Figure 8:
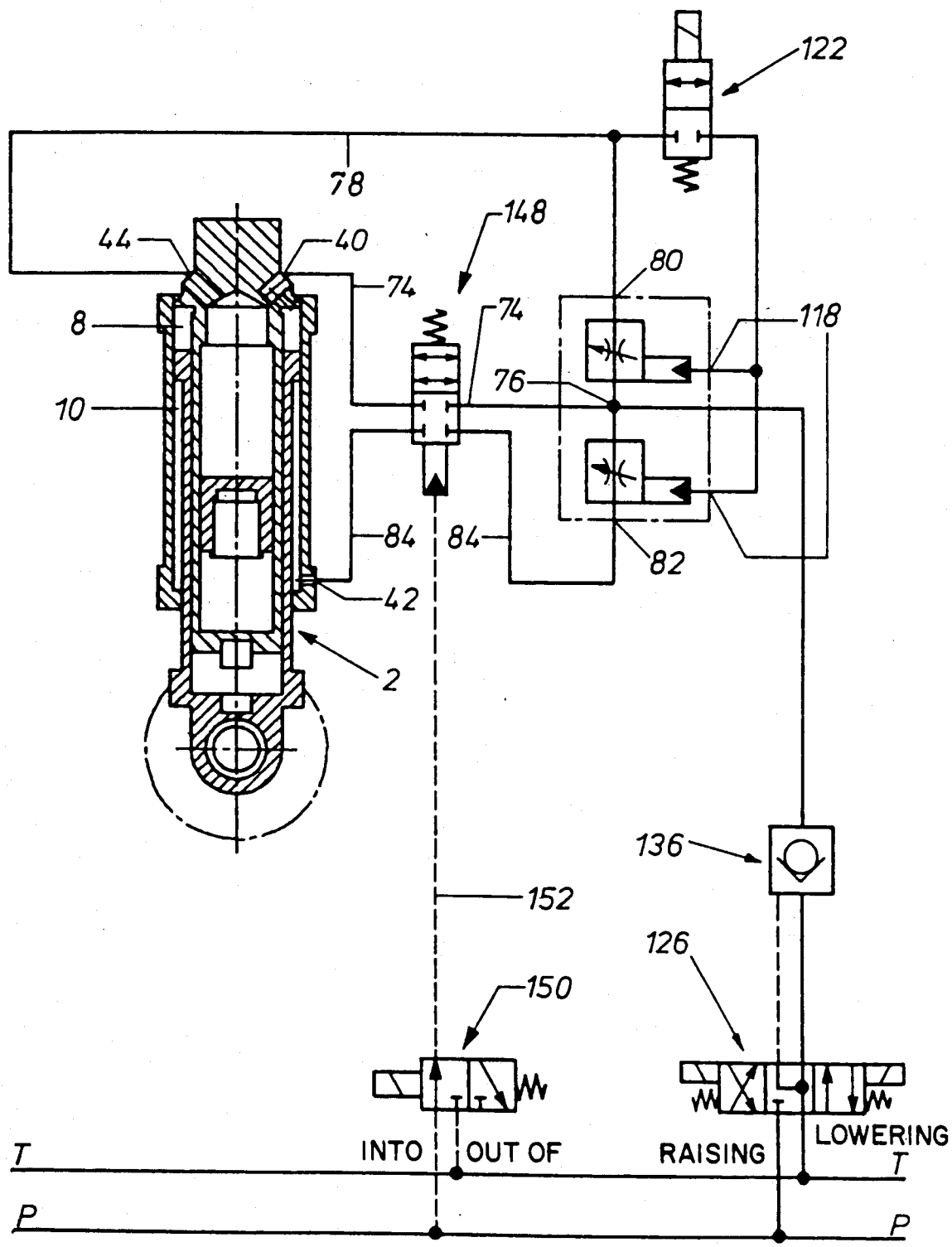
FIG. 8 shows a hydraulic circuit for the load-dependent level adjustment as well as, in addition, for a blocking of the suspension.

In FIG. 8 there is illustrated a further embodiment of the hydropneumatic suspension system of the invention directed to a "blocking" of the hydropneumatic cylinder-piston unit 2.

For this "blocking", it is provided according to the invention, that the hydraulic connection between the two annular chambers 8 and 10 of the cylinder-piston unit 2 is blockable by a blocking valve 148. This blocking valve 148—as is shown in FIG. 8—is switched or connected into preferably both connecting lines 74 and 84 between the connections 40 and 42 of the cylinder-piston unit 2 and the connections 76 and 82 of the damping valve 60. Upon the interruption of the connecting lines 74 and 84, the piston head 6 is "clamped in" between the hydraulic medium in the two annular chambers 8 and 10 so that the cylinder-piston unit 2 is thereby "blocked".

For reasons of safety, the blocking according to the invention is such that, in case of a possible drop-out of the current supply, the blocking is forcibly suspended. For this, the blocking valve 148 is constructed as, for example, a hydraulically operated valve having a rest position generated by a spring force, in which a connection is established between the annular chambers 8 and 10. If, however, the blocking valve 148 is acted upon by pressure, then it switches into its blocking position. This acting-upon by pressure occurs, according to the invention, through an electromagnetically actuatable blocking valve 150, which has an input connected with the pressure line P, as well as an input connected with the reflux line T. One output of the blocking valve 150 is connected to a control line 152, drawn in broken lines, for the operation of of the blocking valve 148.

The blocking valve 150 in its spring-conditioned rest position brings about a connection of the control line 152 with the reflux line T, as well as in its electromagnetically operated switching position—shown in FIG. 8—a connection of the control line 152 with the pressure line P for the acting upon and actuation of the blocking valve 148. In case of a possible current dropout, by reason of this circuit according to the invention, the blocking valve 150 is advantageously brought into its rest position by the spring force, whereby the control line 152 is switched over from the pressure line P to the reflux line T, so that the blocking valve 148 also switches, under the spring force, into its rest position, by which the connection between the annular chambers 8 and 10 is established, and thus the blocking function is suspended.

Figure 9:
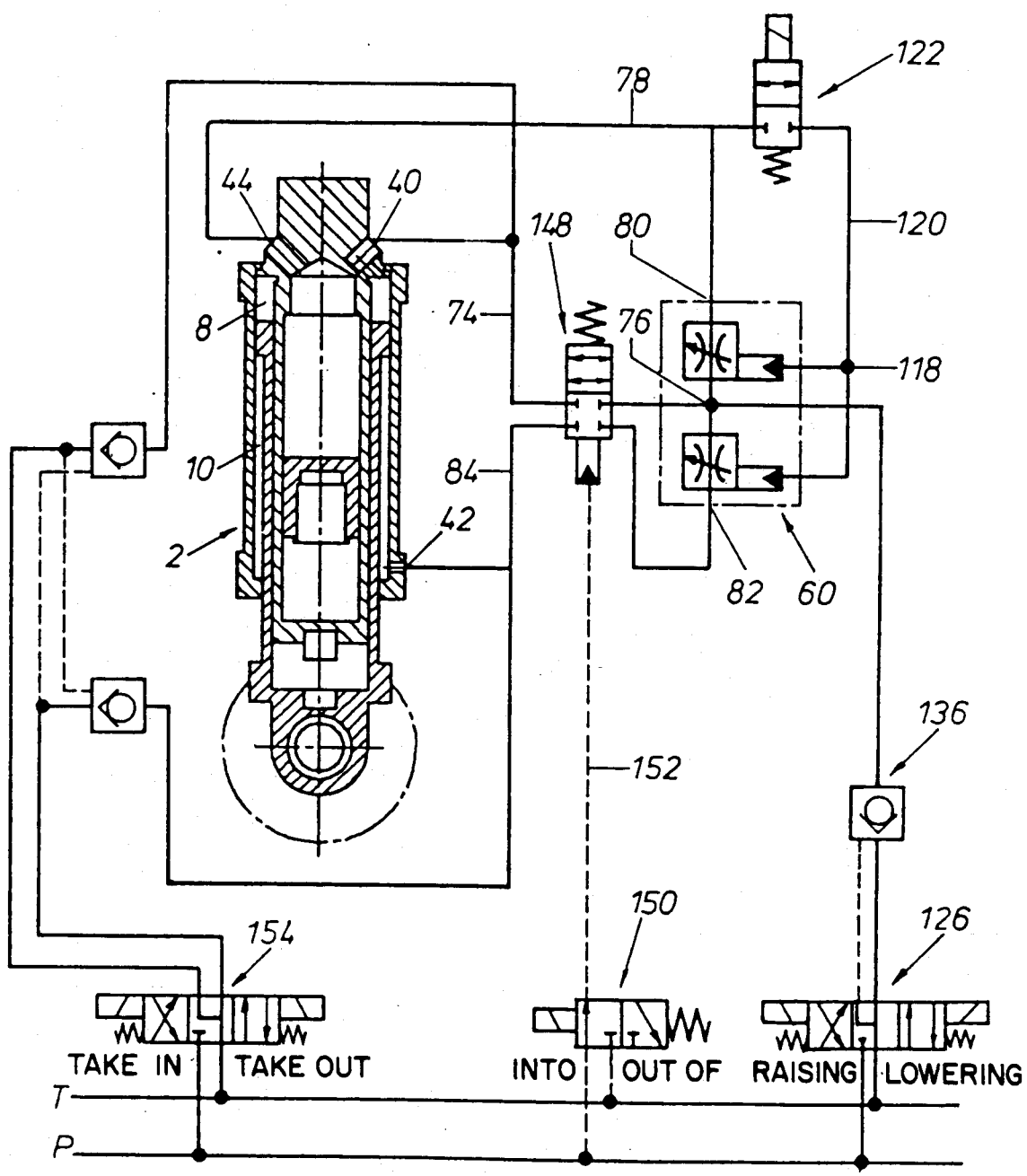
FIG. 9 shows a hydraulic circuit as in FIG. 8 with an additional load-independent level adjustment.

As is further shown by way of example in FIG. 9, according to the invention, by a suitable setting valve 154, the cylinder-piston unit 2 can be raised or lowered at will. For this purpose, as desired, either the pressure line P is connected with the upper annular chamber 8 and the lower annular chamber 10 is connected with the reflux line T (raising), or the pressure line P is connected with the lower annular chamber 10 and the upper annular chamber 8 is connected with the reflux line T (lowering). This measure, in contrast to the above-described "leveling", is advantageously independent of the particular load on the cylinder-piston unit 2.

The hydropneumatic suspension system according to the invention offers, especially in use in motor vehicles, the following substantial advantages:
a) In comparison with known mechnical suspension systems (leaf spring, spring bar, coil spring or the like), substantially better and more comfortable driving behavior;
b) The possibility of a load-dependent damping adjustment;
c) The possibility of an automatic level compensation for the compensation of differing loading of the vehicle;
d) The possibility of blocking the suspension;
e) The possibility of automatic adjustment of the vehicle into a horizontal position, both during travel and also at a standstill;
f) The possibility for changes of the level position of the vehicle during travel, as well as at a standstill (terrain travel or street travel); and
g) The possibility of retracting and extending individual wheels or axles.

The suspension system, according to the invention, is constructed in such a way that the functions mentioned above can be achieved by simply realizable extensions of a basic unit.

The invention is not restricted to the embodiments shown and described above, but comprises also all embodiments functioning in the same manner in the sense of the invention.

We claim:
1. A hydropneumatic suspension system comprising:
   at least one shock and vibration damper including a cylinder-piston unit (2) arranged in a hydraulic circulation with a damping valve (60);
   said cylinder-piston unit (2) including a gas storer (34) coating with said damping valve (60);
   said damping valve (60) provided with choke valves (88, 90, 92, 94) arranged in said hydraulic circulation;
   said choke valves (88, 90, 92, 94) including valve elements (96) biased with springs (98) in a closing direction of said valve elements (96) opposite to an opening direction of said valve elements (96); and
   setting means (100) acting upon said springs (98) in common in at least one of said closing and opening directions of said valve elements (96) to provide a variable bias tension for said springs (98) for permitting a load-dependent damping adjustment.

2. A suspension system according to claim 1, wherein said setting means (100) include a setting spring (112) disposed under a bias tension and a piston rod (114) for transferring said bias tension of said setting spring (112) onto said springs (98) of said valve elements (96) for increasing and reducing bias tensions of said springs (98).

3. A suspension system according to claim 2, wherein said piston rod (114) is connected to a piston head (106), a hydraulic pressure medium of said hydraulic circulation is provided for acting upon said piston head (106) to increase and decrease said bias tension of said setting spring (112).

4. A suspension system according to claim 3, wherein said setting spring (112) and said piston head (106) are disposed in arrangement means for providing a reduced force generated by said bias tension of said setting spring (112) and transferred by said piston rod (114) when pressure of said hydraulic pressure medium acting upon said piston head (106) is increased.

5. A suspension system according to claim 3, wherein said damping valve (60) includes a cylinder chamber (104), said piston head (106) being guided in said cylinder chamber (104), said piston head (106) subdividing said cylinder chamber (104) into a spring chamber (110) and a pressure medium chamber (108), said setting spring (112) being disposed in said spring chamber (110).

6. A suspension system according to claim 5, wherein said pressure medium chamber (108) is connected by a switching valve (122) to a compensation space (32) of said cylinder-piston unit (2).

7. A suspension system according to claim 5, wherein said pressure medium chamber (108) is connected by a control valve (124) to a compensation space (32) of said cylinder-piston unit (2) to provide a pressure reversal.

8. A suspension system according to claim 1, wherein said damping valve (60) is arranged spatially separated from said cylinder-piston unit (2).

9. A suspension system according to claim 1, wherein said damping valve (60) for a springing-in damping includes at least two of said choke valves (90, 94) which are switched in a parallel relationship and have a common entrance into said damping valve (60) and separate exits out from said damping valve (60).

10. A suspension system according to claim 9, wherein said damping valve (60) for a springing-out damping includes at least another two of said choke valves (88, 92) which are switched in a parallel relationship and have separate entrances into said damping valve (60) and a common exit out from said damping valve (60).

11. A suspension system according to claim 10, wherein said entrance of said springing-in choke valves (90, 94) and said exit of said springing-out choke valves (88, 92) coincide in a first connection (76), and said exits of said springing-in choke valves (90, 94) coincide with said entrances of said springing-out choke valves (88, 92) in a second connection (80) and a third connection (82) respectively.

12. A suspension system according to claim 1, wherein said cylinder-piston unit (2) includes a hydraulic cylinder (4) and a piston head (6) disposed inside said cylinder (4), said piston head (6) partitioning an interior of said cylinder (4) into an upper chamber (8) and a lower chamber (10), said upper and lower chambers (8, 10) being filled with a hydraulic medium of said hydraulic circulation, a piston rod (12) connected to said piston head (6) and extending out of said cylinder (4), a compensation space (32) disposed inside said cylinder (4) and connected to said upper chamber (8) through said said damping valve (60), a floating separating piston (30) disposed inside said cylinder (4) and separating said compensation space (32) from said gas storer (34), said compensation space (32) extending in an opposite direction relative to said piston rod (12), said upper and lower chambers (8, 10) being connected to one another through said damping valve (60).

13. A suspension system according to claim 12, wherein said piston rod (12) has a hollow cylindrical construction and said piston head (6) has an annular construction, an inner tube (22) is coaxially arranged inside said cylinder (4) and extends with minimum circumferential play through said piston head (6) and into said piston rod (12), said separating piston (30) being guided inside said inner tube (22).

14. A suspension system according to claim 13, wherein said inner tube (22) is fastened to a head part (18) of said cylinder (4), said head part (18) being disposed opposite a free end of said piston rod (12), said compensation space (32) being arranged inside said inner tube (22) between said head part (18) and said separating piston (30).

15. A suspension system according to claim 12, wherein at least one leveling valve (126) has an inlet side connected to both a pressure line (P) and a reflex line (T) and has an outlet side connected to said upper chamber (8) of said cylinder-piston unit (2) so that said upper chamber (8), in one position of said leveling valve (126), is connected to said pressure line (P); and in another position of said leveling valve (126), said upper chamber (8) is connected to said reflux line (T).

16. A suspension system according to claim 12, wherein a blocking valve (148) is connected between said upper and lower chambers (8, 10) of said cylinder-piston unit (2), said blocking valve (148) in an operating position interrupts flow of said hydraulic medium between said upper and lower chambers (8, 10), and said blocking valve (148) in a spring force-conditioned rest position permits flow of said hydraulic medium between said upper and lower chambers (8, 10).

17. A suspension system according to claim 16, wherein said blocking valve (148) is hydraulically operated by an electromagnetic blocking valve (150).

18. A suspension system according to claim 12, wherein at least one setting valve (154) in a first position connects said upper cylinder chamber (8) with a reflux line (T) and connects said lower cylinder chamber (10) with a pressure line (P), and in a second position connects said upper cylinder chamber (8) with said pressure line (P) and connects said lower cylinder chamber (10) with said reflux line (T).

19. A suspension system according to claim 12, wherein said upper chamber (8) is connected by a connecting line (74) to a first connection (76) of said damping valve (60), said lower chamber (10) is connected by a connecting line (84) to a third connection (82) of said damping valve (60), and said compensation space (32) is connected by a connecting line (78) to a second connection (80) of said damping valve (60).

20. A suspension system according to claim 19, wherein said damping valve (60) includes a valve casing (62) provided with first, second, third and fourth valve chambers (66, 68, 70, 72) arranged in succession and separated respectively by three partitions (63, 64, 65), said first valve chamber (66) having said first connection (76), said second valve chamber (68) having second connection (80), and said fourth valve chamber (72) having said third connection (82).

21. A suspension system according to claim 20, wherein said first valve chamber (66) is connected directly with said third valve chamber (70), said first valve chamber (66) also being connected by a first one (90) of said choke valves for a springing-in damping and by a second one (88) of said choke valves for a springing-out damping with said second valve chamber (68), said third valve chamber (70) being connected by a third one (94) of said choke valves for a springing-in damping and by a fourth one (92) of said choke valves for a springing-out damping with said fourth valve chamber (82).

22. A suspension system according to claim 20, wherein said valve casing (62) includes a cylinder chamber (104) adjacent to said first valve chamber (66), said setting means (100) includes a second piston rod (114) extending from said cylinder chamber (104) through said first, second, third, and fourth valve chambers (66, 68, 70, 72), said second piston rod being provided with counterbearing elements (116) adjacent associated ones of said valve elements (96) of said choke valves (88, 90, 92, 94) for providing a bias tension on associated ones of said springs (98), at least one of said springs 98 being disposed between an associated one of said valve elements (96) and an associated one of said counterbearing elements (116).

23. A suspension system according to claim 20, wherein said valve casing (62) includes a cylinder chamber (140) adjacent to said first valve chamber (66), said setting means (100) includes a second piston rod (114) extending from said cylinder chamber (104) through said first, second, third and fourth valve chambers (66, 68, 70, 72), said second piston rod being provided with counterbearing elements (116) adjacent associated ones of said valve elements (96) of said choke valves (88, 90, 92, 94) for providing a bias tension on associated ones of said springs (98), at least one of said counterbearing elements (116) acting upon a force reversal element (117) of a rocker type, at least one of said springs (98) being disposed between said force reversal element (117) and an associated one of said valve elements (96).

24. A suspension system according to claim 22, wherein said first valve chamber (66) is connected directly with said third valve chamber (70), said first valve chamber (66) also being connected by a first one (90) of said choke valves for a springing-in damping with said second valve chamber (68), said third valve chamber (70) being connected by a second one (88) of said choke valves for a springing-out damping with said second valve chamber (68), said third valve chamber (70) also being connected by a third one (94) of said choke valves for a springing-in damping and by a fourth one (92) of said choke valves for a springing-out damping with said fourth valve chamber (72).

* * * * *